United States Patent [19]
Hlava et al.

[11] Patent Number: 5,470,027
[45] Date of Patent: Nov. 28, 1995

[54] ANTIREVERSE ASSEMBLY FOR A FISHING REEL

[75] Inventors: Lorens G. Hlava, Clinton, Mo.; Thomas A. Pulliam, Broken Arrow, Okla.

[73] Assignee: Zebco Corporation, Tulsa, Okla.

[21] Appl. No.: 741,967

[22] Filed: Aug. 6, 1991

[51] Int. Cl.⁶ .................................................. A01K 89/027
[52] U.S. Cl. ................................................ 242/247; 242/300
[58] Field of Search ................................ 242/247, 248, 242/298, 299, 300

[56] References Cited

U.S. PATENT DOCUMENTS

| | | |
|---|---|---|
| 4,376,518 | 3/1983 | Gifford et al. |
| 4,408,729 | 10/1983 | Moss et al. |
| 4,695,009 | 9/1987 | Swisher. |
| 4,729,527 | 3/1988 | Maruyama et al. ............ 242/247 |
| 4,735,376 | 4/1988 | Hlava ............................ 242/247 |
| 4,923,141 | 5/1990 | Sazaki et al. .................. 242/247 |
| 5,042,741 | 8/1991 | Aota ............................. 242/247 |

FOREIGN PATENT DOCUMENTS 1065103  5/1954  France ............................ 242/247

*Primary Examiner*—Katherine Matecki
*Attorney, Agent, or Firm*—Wood, Phillips, VanSanten, Hoffman & Ertel

[57] ABSTRACT

An antireverse mechanism in a fishing reel of the type having a housing with a rear wall. The reel also includes a line carrying spool, a crank shaft that is rotatable about a first axis and a structure for directing line onto the spool as an incident of the crank shaft rotating about the first axis in a first direction. The antireverse mechanism is selectably placeable in a) an "on" position for preventing rotation of the crank shaft about the first axis opposite to the first direction and b) an "off" position for allowing the crank shaft to rotate about the first axis opposite the first direction. An actuator switch for placing the antireverse mechanism selectively in its "on" and "off" positions is provided. A mounting structure mounts the actuator switch to the rear housing wall for movement between first and second positions corresponding to the "on" and "off" positions of the antireverse mechanism.

9 Claims, 2 Drawing Sheets

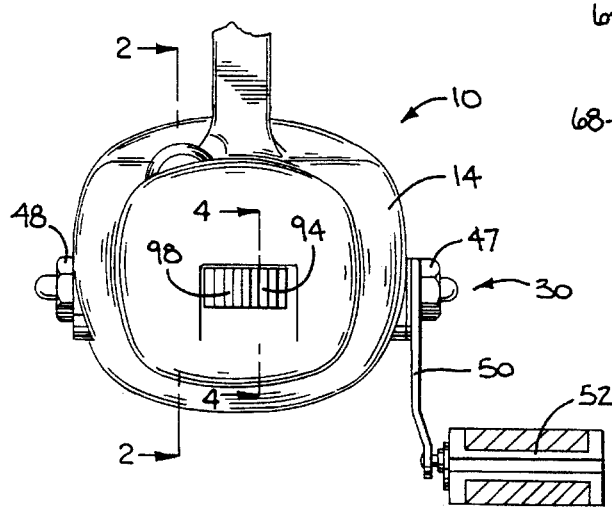
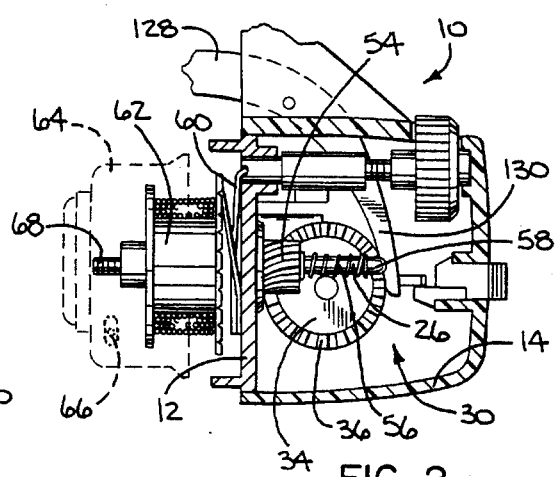

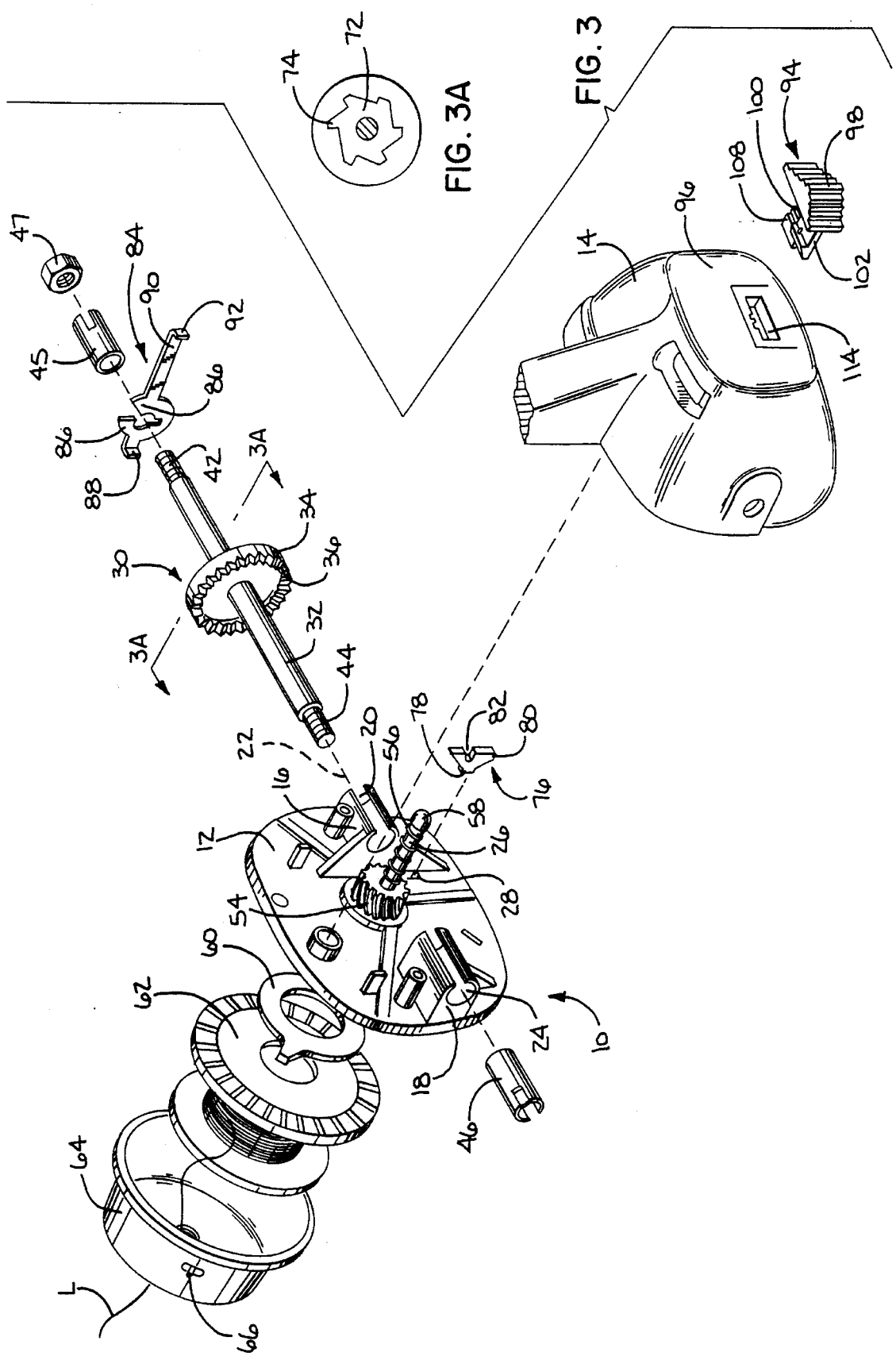

ANTIREVERSE ASSEMBLY FOR A FISHING REEL

BACKGROUND OF THE INVENTION

1. Technical Field

The present invention relates to fishing reels and, more particularly, to an improved antireverse assembly for a fishing reel.

2. Background Art

Antireverse mechanisms in fishing reels of the type having a housing with a peripheral side wall, a line carrying spool, a crank shaft that is rotatable about a first axis and a spinner head for directing line onto the spool as an incident of the crank shaft rotating about the first axis in a line retrieval or first direction are well known in the art. These antireverse mechanisms function to prevent rotation of the crank shaft about the first axis in a line pay out direction or a direction opposite the first direction.

The antireverse mechanisms can be placed in an "on" position wherein rotation of the crank shaft about the first axis in the line pay out direction is prevented and an "off" position wherein the crank shaft is free to rotate about the first axis in the line pay out direction. A rotatable actuator switch for selectively placing the antireverse mechanism in its "on" or "off" position is provided on the side wall of the fishing reel housing. The actuator switch engages an actuator and pivots the actuator arm between its "on" and "off" position as the actuator switch is pivoted.

The prior art antireverse mechanism control switches are often inconvenient to use because the reel must be moved into a position where the side housing can be viewed by a user who is typically standing behind the reel. Further, in many instances the control switch is difficult to operatively attach to the antireverse mechanism. Finally, the actuator switch in conventional reels is normally made to have a low profile so as not to be an obtrusive addition on the external surface of the reel housing. This, however, makes the actuator switch difficult to operate, often requiring the user to reach into an undercut to turn the actuator switch held between adjacent fingertips.

SUMMARY OF THE INVENTION

The present invention is directed toward overcoming one or more of the problems discussed above.

The present invention is an improved antireverse mechanism in a fishing reel of the type having a housing with a rear wall. The reel further includes a line carrying spool, a crank shaft that is rotatable about a first axis and a structure for directing line onto the spool as an incident of the crank shaft rotating about the first axis in a line retrieval or first direction. The improved antireverse mechanism is selectably placeable in a) an "on" position for preventing rotation of the crank shaft about the first axis opposite to the first direction and b) an "off" position for allowing the crank shaft to rotate about the first axis opposite the first direction. An actuator switch is provided for placing the antireverse mechanism selectively in its "on" and "off" positions. A mounting structure mounts the actuator switch to the rear housing wall for movement between first and second positions corresponding to the "on" and "off" positions of the antireverse mechanism.

The actuator switch of the improved antireverse mechanism may be mounted on a substantially flat outer surface of the rear wall of the reel housing. The actuator switch can be translatable between its first and second positions relative to the rear housing wall. The structure for mounting the rear actuator switch to the rear housing wall may include an opening in the rear housing wall and a structure for engaging the actuator switch to an interior surface of the rear housing wall by a snap fit through the rear housing wall.

The antireverse mechanism may include a plurality of ratchet teeth on the crank shaft and a pawl pivotable between an a) engaging position wherein the pawl is in the path of the ratchet teeth as the crank shaft rotates about the first axis opposite to the first direction and b) a nonengaging position wherein the pawl is out of the path of the ratchet teeth. An actuator is releasably frictionally connected to the crank shaft with a predetermined gripping force. By virtue of the gripping force the actuator pivots to follow rotation of the crank shaft but slips relative to the crank shaft when the actuator arm encounters a resistance greater than the predetermined gripping force. The actuator with the actuator switch in its second position, pivots the pawl into its engaging position when the crank shaft is rotated about the first axis opposite to the first direction. The actuator switch, when moved into its second position, provides a resistance greater than the predetermined gripping force to prevent the actuator from pivoting the pawl into the engaging position when the crank shaft rotates in the direction opposite the first direction. The actuator may include a resilient elongate arm extending from the crank shaft to the actuator switch on the rear housing wall.

The improved antireverse mechanism of the present invention provides an actuator switch on the rear housing wall which is readily viewable by a user of the fishing reel standing behind the fishing reel. In addition, because the actuator switch is mounted on the rear of the reel housing wall, it is easily and conveniently switched between its "on" and "off" positions by a fishing reel user. Additionally, with the actuator switch on the flat surface of the rear housing wall, the actuator switch is readily accessible and operable without being obtrusive.

BRIEF DESCRIPTION OF THE DRAWINGS

FIG. 1 is a rear elevation view of a fishing reel including the improved antireverse mechanism of the present invention;

FIG. 2 is a cross-sectional view of the fishing reel taken along line 2—2 of FIG. 1;

FIG. 3 is an exploded perspective view of a fishing reel including the improved antireverse mechanism of the present invention;

FIG. 3A is a cross-sectional view of a crank shaft and ratchet in the inventive antireverse mechanism taken along line 3A–3A of FIG. 3;

FIG. 4 is a cross-sectional view of the improved antireverse mechanism of the present invention taken along line 4—4 of FIG. 1;

FIG. 5A is a cross-sectional view of the antireverse actuator switch taken along line 5—5 of FIG. 4 and shown in its "off" position; and FIG. 5B is a view as in FIG. 5A with the actuator switch in its "on" position.

DETAILED DESCRIPTION OF THE PREFERRED EMBODIMENT

A fishing reel 10 includes a reel frame body or deck plate 12 captively held between a front housing (not shown) and a cup-shaped rear housing 14. The deck plate 12 has a first rearward extending boss 16 and a second rearward extending boss 18. The first boss 16 defines a center shaft receiving cylinder 20 with a first axis 22. The second boss 18 defines a second crank shaft receiving cylinder 24 concentric with the first axis 22. The deck plate 12 further includes a center shaft receiving bore (not shown) through which a center shaft 26 extends forwardly and rearwardly from the deck plate 12. The deck plate 12 further includes a pawl tab receiving slot 28 defined in its rearward facing surface.

The fishing reel 10 also includes a drive mechanism 30. The drive mechanism 30 includes a crank shaft 32 having a coaxial face gear 34 thereon. The face gear 34 has a plurality of axially extending teeth 36 extending from a forward side. Opposing ends 42,44 of the crank shaft 32 are slidably received by sleeve inserts 45,46 which function both as a bushing for facilitating rotation of the crank shaft 32 about the first axis 22 and to radially secure the crank shaft 32 in the cylinders 20,24. The distal portions of the opposing ends 42,44 are threaded for threadable engagement by nuts 47,48 to axially secure the center shaft 32 in the bosses 16,18 of the deck plate 12 (see FIG. 1). A crank handle 50 is secured about one end 42 of the crank shaft 32 by the nut 46. A crank knob 52 is connected to the opposite end of the crank handle 50.

The drive mechanism 30 further includes the center shaft 26. The center shaft 26 includes a pinion gear 54 attached thereto. The pinion gear 54 may either be splined onto a keying portion (not shown) of the center shaft 26 or integrally formed thereon. A spring 56 is fixed on the center shaft 26 between a rearward facing surface of the pinion gear 54 and an enlarged head 58 on the rearward end of the center shaft 26. When the center shaft 26 is seated in the deck plate as illustrated in FIGS. 2 and 3, the pinion gear 54 cooperatively interengages the axially projecting teeth 36 of the face gear 34.

Mounted forwardly of the deck plate 12 axially about a forward projecting hub (not shown) on the deck plate 12 is a drag clutch plate 60. Abutting the drag clutch plate 60 is a line spool 62. A spinner head 64 having a retractable pickup pin 66 captively receives the line spool 62 and is threadably secured to the threaded forward end 68 of the center shaft 26.

The fishing reel 10 further includes an antireverse mechanism 70 best illustrated in FIG. 4. The antireverse mechanism 70 includes a ratchet 72 having a plurality of radially extending, circumferentially spaced ratchet teeth 74, affixed to the back of the face gear 34. The antireverse assembly 70 also includes a pivotable pawl 76 having a pivot tab 78, a pawl tooth 80 and a recess 82.

A flat pawl actuator 84 is also included in the antireverse mechanism 70 in axial abutment with the ratchet 72. The pawl actuator 84 has a pair of bifurcated legs 86 which grip the surface of the center shaft 32 with sufficient frictional force that the pawl actuator 84 will rotate with the crank shaft 32, but will slide relative to the crank shaft 32 when the gripping force is exceeded. A pawl engaging tab 88 extends transverse to the plane of the pawl actuator 84. An elongate actuator arm 90 extends rearwardly on the pawl actuator 84 and has an actuator switch engaging tab 92 extending transverse of the plane of the pawl actuator 84 at the rearward free end thereof.

The antireverse mechanism 70 also has an actuator switch 94 attached to a planar rear wall surface 96 of the cup-shaped rear housing 14. The actuator switch 94 includes a head portion 98 accessible outwardly and rearwardly of the cup shaped rear housing 14. Extending forwardly from the head 98 is a lower shank 100 and an upper shank 102. The lower shank 100 has a flange 104 with an inclined leading surface 106. The flange 104 and inclined leading surface 106 extend to a shelf portion 108 extending from one side of the lower shank 100. The upper shank 102 also includes a flange 110 having an inclined leading surface 112.

The cup-shaped rear housing has a rectangular bore/hole 114 in the planar rear wall 96. A lower stud 116 extends forward from and transverse to the planar rear wall 96 at the lower edge 118 of the rectangular bore 114. An upper stud 120 extends forward from and transverse to the planar rear wall 96 at the upper edge 122 of the rectangular bore 114. The lower shank 100 of the actuator switch 94 is longer than the upper shank 102 of the actuator switch 94. The rearward end 124 of the lower stud 116 is captively received by the flange 104 of the lower shank 100. In a like manner, the rearward end 126 of the upper stud 120 is captively received by the flange 110 of the upper shank 102.

The actuator switch 94 is preferably formed of a resilient plastic material. When formed of such a resilient material, the actuator switch 94 can be inserted in the rectangular bore 114 in the rear wall 96 by aligning the lower and upper shanks 100,102 between the lower edge 118 and upper edge 122 of the rectangular bore 114 and then pushing the actuator switch 94 forward relative to the rear planar wall 96. By virtue of the inclined leading surfaces 106,112 of the lower shank flange 104 and upper flange 110, respectively, the lower and upper shanks 100,102 will deflect toward each other until they are inserted to the point that the flanges 104,110 reach the rearward ends 124,126 of the lower and upper studs 116,120 respectively. At that point the resilient lower and upper shanks 100,102 will snap down and up respectively to capture the rearward edges 124,126 of the lower and upper studs 116,120 respectively.

Briefly, the operation of the fishing reel 10 can be described as follows. The center shaft 26 is biased rearwardly by the spring 56. Upward movement of the trigger arm 128 causes center shaft 26 to be pushed forward relative to the deck plate 12 by the push arm 130. The spinner head 64 attached to the forward end 68 of the center shaft 26 is thereby pushed forward against an inside rearwardly facing surface on the front cover (not shown). The line L is then trapped between the spinner head 64 and the front cover to prevent the line L from being payed out from the line spool 62. Forward displacement of the spinner head 64 also causes the pickup pin 66, which normally projects radially through the spinner head 64, to be withdrawn to thereby allow the line L to freely uncoil from the spool 62. When the line L is to be cast forward, the user releases the trigger arm 128, causing the spinner head 64 to move rearwardly relative to the front cover by action of the spring 56, thereby allowing the line L to be payed out from the line spool 62. After the line L has been payed out, the user rotates the handle in a line retrieving direction which causes the pickup pin 66 in the spinner head 64 to project through the spinner head 64 to thereby pick up the line L.

Retrieval of the line L is effected by continuous rotating of the center shaft 26 by means of the crank handle 50. More particularly, rotating the crank knob 52 rotates the crank handle 50 which in turn rotates the crank shaft 32. The axially projecting teeth 36 of the face gear 34 cooperatively interengage the teeth of the pinion gear 54 thereby imparting rotation to the center shaft 26 as incident of rotation of the crank shaft 32. Rotation of the center shaft 26 in turn rotates the spinner head 64 causing the pickup pin 66 to wind line L onto the line spool 62.

Line may also be inadvertently uncoiled from the line spool 62 by rotation of the crank shaft in a direction opposite the line retrieval direction. To prevent this result when it is not desired, the antireverse mechanism 70 is provided.

The operation of the antireverse mechanism 70 is best understood with reference to FIG. 4. As viewed in FIG. 4, rotation of the crank shaft 32 in a counterclockwise or first direction prevents the ratchet teeth 74 from engaging the pawl tooth 80 of the pawl 76. Pivoting of the the pawl actuator 84 stops and the crank shaft 26 slides relative to the pawl actuator 84 once the pawl 76 is fully pivoted in its clockwise direction. Rotation of the crank shaft 32 in this direction constitutes the line retrieval direction.

The antireverse action of the antireverse mechanism 70 is illustrated in the phantom lines in FIG. 4. Rotation of the crank shaft 26 in the clockwise direction or opposite the first direction similarly causes clockwise pivoting of the pawl actuator 84. This clockwise pivoting of the pawl actuator 84 causes the pawl engaging tab 88 to act against the recess 82 in the pawl 76 to pivot the pawl 76 in a counterclockwise direction. Counterclockwise pivoting of the pawl 76 causes the pawl tooth 80 to engage a ratchet tooth 74 of the ratchet 70, thereby halting further rotation of the crank shaft 26 in a clockwise direction. This action corresponds to the antireverse mechanism 70 being placed in an "on" position. That is, as illustrated in FIG. 5A, the shelf 108 of the actuator switch 94 does not interfere with the movement of the elongate actuator arm 90. As viewed from the rear and top of the reel 10, the actuator switch is to the left when the antireverse mechanism is in its "on" position.

The antireverse mechanism can be moved to its "off" position by translational movement of the switch 94 to the right as viewed from the rear and top of the reel. When the actuator switch 94 is aligned as illustrated in FIG. 5B, the shelf 108 protrudes beyond the upper stud 120 and interferes with the downward or clockwise pivoting of the elongate actuator arm 90 and therefore the pawl actuator 84 as best seen in FIGS. 4 and 5B. When the shelf so interferes with the clockwise pivot of the pawl actuator 84, the pivoting of the pawl actuator 84 is halted because the gripping force of the pawl actuator 84 is exceeded, and therefore the crank shaft 26 slides relative to the pawl actuator 84. The pawl tooth 80 is therefore prevented from engaging one of the ratchet teeth 74. Thus, the crankshaft 26 is free to rotate in a clockwise direction and therefore free to pay out line from the line spool 62.

In the event the actuator switch 94 is moved to the right as illustrated in FIG. 5B while the antireverse mechanism 70 is in its engaged position as seen in the ghost lines in FIG. 4, the elongate actuator arm 90 will not rest upon the shelf 108 as is desired and as illustrated in FIG. 5B, but will be pushed to the left as illustrated in phantom lines in FIG. 5B. However, upon any movement of the crank shaft in a counterclockwise direction, the resilient elongate actuator arm 90 will pivot counterclockwise and will snap onto the shelf 108 to assume the desired position as illustrated in FIG. 5B.

The improved antireverse mechanism of the present invention provides an antireverse actuator switch on the rear wall of the reel frame for ease of access and visual inspection. In addition, the translational movement of the actuator switch relative to the reel housing provides a highly durable and highly reliable device for actuating the antireverse mechanism. Finally, the resilient elongate actuator arm of the pawl actuator permits locating the actuator switch on the rear wall of the reel housing.

We claim:

1. An improved antireverse mechanism in a fishing reel having a line-carrying spool mounted to a deckplate, a crank shaft that is rotatable about a first axis and means for directing line onto the spool as an incident of the crank shaft rotating about said first axis in a first direction, the spool, deckplate and crank shaft being at least partially contained within a housing having an outer surface, the improvement comprising:

an elongate slot in the housing;

antireverse means selectively placable in a) an on position for preventing rotation of the crank shaft about said first axis opposite to said first direction and b) an off position for allowing the crank shaft to rotate about said first axis opposite to the first direction;

an actuator switch for placing the antireverse means selectively in its on and off positions; and means for snap fit engagement between the housing and the actuator switch, said snap fit engagement means including first and second parallel shanks extending from the actuator switch and into the elongate slot, the first and second shanks each having oppositely extending transverse flanges, the transverse flanges being configured to engage an inner surface of the housing, the shanks having a width dimension parallel to the length of the slot sufficient so that the actuator switch cannot be rotated in the slot and can only be moved by translation within the slot.

2. The antireverse mechanism of claim 1 wherein the housing further includes a rear wall and the means for snap fit engagement mounts the actuator switch to the rear wall.

3. The improved antireverse mechanism according to claim 2 wherein the rear wall is substantially flat.

4. The antireverse mechanism of claim 1 wherein the means for snap fit engagement comprises means for guiding translational movement of the actuator switch between first and second positions corresponding to the an and off positions of the antireverse means.

5. The antireverse mechanism of claim 1 wherein the actuator switch includes a head having a surface exposed outside of the housing and a housing abutting surface.

6. The antireverse mechanism of claim 5 wherein the snap fit engagement means further includes first and second studs having distal ends extending inward relative to the housing from inner surface of the housing at opposite sides of the slot in the housing, the distal transverse flanges of the first and second shanks engaging the distal ends of the first and second studs, respectively.

7. In a fishing reel having a deck plate supporting a front housing and a cup-shaped rear housing the front and rear housings having inner and outer surfaces surrounding at least a portion of a crank shaft that is selectively rotatable about a first axis in first and second opposite directions, a line carrying spool, and means for directing line on the spool as an incident of the crank shaft being rotated in the first direction and antireverse means selectively placable in a) an on position for preventing rotation of the crank shaft in the second direction and b) an off position for allowing the crank shaft to rotate in the second direction, the improvement comprising:

a rear wall of the rear housing having a planar surface;

an actuator switch for placing the antireverse means selectively in its on and off positions; and means for mounting the actuator switch to the rear wall in abutment with the planar rear wall surface for movement between a first and a second position corresponding to the on and off position of the antireverse means, wherein the mounting means comprises:

an elongate slot in the rear wall, the slot having a depth extending between the inner and outer surfaces of the rear housing; and first and second parallel shanks extending from the actuator switch and into the elongate slot, the first and second shanks each having oppositely extending transverse flanges, the transverse flanges being configured to engage an inner surface of the housing, the shanks having a width dimension parallel to the length of the slot sufficient so that the actuator switch cannot be rotated in the slot and can only be moved by translation within the slot.

8. The improved fishing spin reel of claim 7 wherein the transverse flanges each have a leading end each leading end having an inclined leading surface for facilitating insertion of the first and second shanks into the slot.

9. In a fishing reel having a deck plate supporting a front housing and a cup-shaped rear housing, the front and rear housings having inner and outer surfaces at least partially surrounding a crank shaft that is selectively rotatable about a first axis in first and second opposite directions, a line carrying spool, and means for directing line on the spool as an incident of the crank shaft being rotated in the first direction and antireverse means selectively placable in a) an on position for preventing rotation of the crank shaft in the second direction and b) an off position for allowing the crank shaft to rotate in the second direction, the improvement comprising:

a rear wall of the rear housing having a planar surface:

an actuator switch for placing the antireverse means selectively in its on and off positions; and means for mounting the actuator switch to the rear wall in abutment with the planar rear wall surface for movement between a first and a second position corresponding to the on and off position of the antireverse means, wherein the anti-reverse means includes a ratchet member rotatable with the crank shaft and an anti-reverse pawl mounted for pivoting movement generally about a second axis parallel to the axis of the crank shaft, the pawl pivoting between a) a first position wherein the pawl acts against the ratchet member to block rotation of the crank shaft in the second direction and b) a second position wherein the crank shaft can be rotated in the second direction, the improvement further comprising:

an antireverse actuator releasable frictionally connected to the crank shaft with a predetermined gripping force, the gripping force causing the actuator to follow rotation of the crank shaft but slipping relative to the crank shaft when the actuator encounters a resistance greater than the predetermined gripping force, the actuator having a pawl engaging and extending radially in one direction and an actuator switch engaging at extending radially in a direction opposite the one direction, the mounting means including an elongate slot in the rear wall of the rear housing, the slot having a depth extending between the inner and outer surfaces of the rear wall, first and second parallel shanks extending from the actuator switch and into the elongate slot in the rear wall of the rear housing, the first and second shanks each having oppositely extending transverse flanges, the transverse flanges being configured to engage an inner surface of the rear wall, the shanks having a width dimension parallel to the length of the slot sufficient so that the actuator switch cannot be rotated in the slot and can only be moved by translation within the slot, the first parallel shank further including a shelf attached thereto, the shelf, with the actuator switch in its second position, engaging the actuator switch engaging arm of the actuator and providing a resistance on the actuator greater than the predetermined gripping force to prevent the actuator from pivoting the pawl into its first position and the shelf, with the actuator switch in its first position, not engaging the actuator switch engaging and to thereby allow the actuator to pivot the pawl into its second position.

* * * * *